(12) United States Patent
Jang et al.

(10) Patent No.: US 11,799,093 B2
(45) Date of Patent: Oct. 24, 2023

(54) CATALYST ELECTRODE FOR FUEL CELL, MANUFACTURING METHOD THEREOF AND A FUEL CELL COMPRISING THE CATALYST ELECTRODE FOR FUEL CELL

(71) Applicant: KOREA INSTITUTE OF SCIENCE AND TECHNOLOGY, Seoul (KR)

(72) Inventors: Jong Hyun Jang, Seoul (KR); Hyun Seo Park, Seoul (KR); Hee-Young Park, Seoul (KR); Katie Heeyum Lim, Seoul (KR); Oh Sub Kim, Seoul (KR); Hyoung-Juhn Kim, Seoul (KR); Jin Young Kim, Seoul (KR); Sung Jong Yoo, Seoul (KR); Dirk Henkensmeir, Seoul (KR); So Young Lee, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 0 days.

(21) Appl. No.: 17/677,723

(22) Filed: Feb. 22, 2022

(65) Prior Publication Data

US 2022/0181646 A1    Jun. 9, 2022

Related U.S. Application Data

(62) Division of application No. 16/934,893, filed on Jul. 21, 2020, now Pat. No. 11,289,711.

(30) Foreign Application Priority Data

Feb. 28, 2020  (KR) .................. 10-2020-0024846

(51) Int. Cl.
*H01M 4/92*  (2006.01)
*H01M 4/86*  (2006.01)
(Continued)

(52) U.S. Cl.
CPC ......... *H01M 4/926* (2013.01); *H01M 4/8652* (2013.01); *H01M 4/8828* (2013.01); *H01M 4/8892* (2013.01); *H01M 4/9016* (2013.01)

(58) Field of Classification Search
CPC ..................................... H01M 4/926
See application file for complete search history.

(56) References Cited

U.S. PATENT DOCUMENTS 5,523,177 A    6/1996  Kosek et al.
2010/0009240 A1 *  1/2010  Fly .................. H01M 4/8663
                                                              502/159

(Continued)

FOREIGN PATENT DOCUMENTS

KR    10-2018-0079635 A    7/2018
KR        10-1955666 B1    3/2019
(Continued)

*Primary Examiner* — Brian R Ohara
(74) *Attorney, Agent, or Firm* — Rabin & Berdo, P.C.

(57) ABSTRACT

Disclosed are a catalyst electrode for a fuel cell, a method for fabricating the catalyst electrode, and a fuel cell including the catalyst electrode. The presence of an ionomer-ionomer support composite in the catalyst electrode prevents the porous structure of the catalyst electrode from collapsing due to oxidation of a carbon support to avoid an increase in resistance to gas diffusion and can stably secure proton channels. The presence of carbon materials with high conductivity is effective in preventing the electrical conductivity of the electrode from deterioration resulting from the use of a metal oxide in the ionomer-ionomer support composite and is also effective in suppressing collapse of the porous structure of the electrode to prevent an increase in resistance to gas diffusion in the electrode. Based on these effects, the fuel cell exhibits excellent performance characteristics and prevents its performance from deteriorating during continuous operation.

6 Claims, 13 Drawing Sheets

(51) Int. Cl.
*H01M 4/88* (2006.01)
*H01M 4/90* (2006.01)

(56) References Cited

U.S. PATENT DOCUMENTS

| | | | |
|---|---|---|---|
| 2010/0291463 A1 | 11/2010 | Ji et al. | |
| 2010/0291467 A1 | 11/2010 | Ji et al. | |
| 2012/0225958 A1 | 9/2012 | Wang et al. | |
| 2014/0322453 A1 | 10/2014 | Namba | |
| 2019/0207238 A1 | 7/2019 | Son et al. | |
| 2020/0127298 A1* | 4/2020 | Xie | H01M 4/8892 |
| 2020/0176785 A1 | 6/2020 | Kim et al. | |
| 2020/0176798 A1* | 6/2020 | Gidwani | H01M 4/8626 |
| 2020/0212469 A1 | 7/2020 | Ko et al. | |
| 2020/0358108 A1* | 11/2020 | Kim | H01M 4/8892 |
| 2021/0135241 A1* | 5/2021 | Oh | H01M 4/8882 |

FOREIGN PATENT DOCUMENTS

| | | | | |
|---|---|---|---|---|
| KR | 10-2019-0077736 A | 7/2019 | | |
| KR | 10-2001470 B1 | 10/2019 | | |
| WO | 2018/067627 A1 | 4/2018 | | |
| WO | WO-2018067627 A1 * | 4/2018 | | H01M 4/8892 |
| WO | WO-2018139286 A1 * | 8/2018 | | |
| WO | 2018/236119 A1 | 12/2018 | | |
| WO | WO-2019017538 A1 * | 1/2019 | | H01M 4/86 |

* cited by examiner

CATALYST ELECTRODE FOR FUEL CELL, MANUFACTURING METHOD THEREOF AND A FUEL CELL COMPRISING THE CATALYST ELECTRODE FOR FUEL CELL

CROSS-REFERENCE TO RELATED APPLICATIONS

This application is a division of U.S. application Ser. No. 16/934,893, filed on Jul. 21, 2020, which claims priority under 35 U.S.C. § 119 to Korean Patent Application No. 10-2020-0024846 filed on Feb. 28, 2020 in the Korean Intellectual Property Office, the disclosure of which is incorporated herein by reference in its entirety.

BACKGROUND OF THE INVENTION

1. Field of the Invention

The present invention relates to a catalyst electrode for a fuel cell, a method for fabricating the catalyst electrode, and a fuel cell including the catalyst electrode.

2. Description of the Related Art

Fuel cells are systems that convert chemical energy of fuel into electrical energy. Fuel cells use hydrogen gas and oxygen gas in the air as fuels. The hydrogen gas is produced by reforming or water electrolysis of a hydrocarbon fuel such as methanol or ethanol. The hydrogen electrochemically reacts with the oxygen to form water. The fuel cells based on this electrochemical reaction to produce electricity are considered as clean energy sources with high power and conversion efficiency compared to traditional internal combustion engines.

A typical fuel cell has a basic structure consisting of an anode, a cathode, and a polymer electrolyte membrane. A catalyst layer on anode promotes the oxidation of a hydrogen fuel and another catalyst layer on cathode promotes the reduction of an oxygen. The hydrogen fuel is oxidized at the anode to generate protons and electrons, the protons are transferred to the cathode through the electrolyte membrane, and the electrons are transferred to an external circuit through a wire. The protons transferred through the electrolyte membrane, the electrons transferred from the external circuit through the wire, and oxygen combine at the cathode to form water. The flow of the electrons passing via the anode, the external circuit, and the cathode becomes electric power. The catalyst contained in the cathode promotes the electrochemical reduction of the oxygen and the catalyst contained in the anode promotes the electrochemical oxidation of the fuel.

The performance of fuel cells is strongly dependent on the performance of catalysts used in the anode and the cathode. Platinum (Pt) is the most widely used material for the catalyst electrodes. Particularly, Pt/C catalysts have recently been used as the most representative materials for catalyst electrodes. Pt/C catalysts have a structure in which platinum particles are loaded on a carbon support with large specific surface area and high electrical conductivity. It is important to reduce the amount of the platinum loaded on the carbon support because the platinum is an expensive precious metal. It is also necessary to maximize the performance of the catalysts by optimizing the related factors such that effective loading of a small amount of the platinum is achieved. In recent years, catalyst electrodes have been developed in which particles of alloys of platinum (Pt) and other metals, for example, transition metals such as nickel (Ni), palladium (Pd), rhodium (Rh), titanium (Ti), and zirconium (Zr), are loaded on carbonaceous supports.

However, the carbon supports are prone to oxidation and lose their performance due to instability of the electrodes under electrochemical conditions during operation of fuel cells. Thus, there is a need for a solution to the problem of poor long-term stability of carbon supports encountered in the commercialization of fuel cell technology.

PRIOR ART DOCUMENTS

Patent Documents (Patent Document 1) Korean Patent Publication No. 10-2018-0079635
(Patent Document 2) Korean Patent Publication No. 10-2018-0040394

SUMMARY OF THE INVENTION

The present invention intends to prevent the performance of a fuel cell from deteriorating when a carbon support is degraded during operation of the fuel cell, causing collapse of the structure of a catalyst electrode, and an object of the present invention is to provide a catalyst electrode for a fuel cell including an ionomer-ionomer support composite and carbon materials and a method for fabricating the catalyst electrode.

One aspect of the present invention is directed to a catalyst electrode for a fuel cell including a carbon support loaded with metal catalyst particles, an ionomer-ionomer support composite, and carbon materials selected from the group consisting of carbon nanotubes, carbon nanofibers, carbon nanorods, and mixtures thereof wherein the ionomer-ionomer support composite includes an ionomer support including a metal oxide and an ionomer covering the ionomer support.

A further aspect of the present invention is directed to a method for fabricating a catalyst electrode for a fuel cell, including (a) preparing a mixed solution containing a metal oxide and an ionomer, (b) stirring and drying the mixed solution to prepare an ionomer-ionomer support composite, (c) adding the ionomer-ionomer support composite, carbon materials, and a carbon support loaded with metal catalyst particles to a solvent, followed by mixing to form an electrode slurry, and (d) fabricating a catalyst electrode using the electrode slurry wherein the carbon materials are selected from the group consisting of carbon nanotubes, carbon nanofibers, carbon nanorods, and mixtures thereof.

Another aspect of the present invention is directed to a fuel cell including the catalyst electrode.

The presence of the ionomer-ionomer support composite in the catalyst electrode of the present invention prevents the porous structure of the catalyst electrode from collapsing due to oxidation of the carbon support to avoid an increase in resistance to gas diffusion and can stably secure proton channels. The presence of the additional carbon materials with high conductivity is effective in preventing the electrical conductivity of the electrode from deterioration resulting from the use of the metal oxide in the ionomer-ionomer support composite and is also effective in suppressing collapse of the porous structure of the electrode to prevent an increase in resistance to gas diffusion in the electrode. Based on these effects, the fuel cell of the present invention exhibits excellent performance characteristics and prevents its performance from deteriorating during continuous operation.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE INVENTION

Figure 1A:
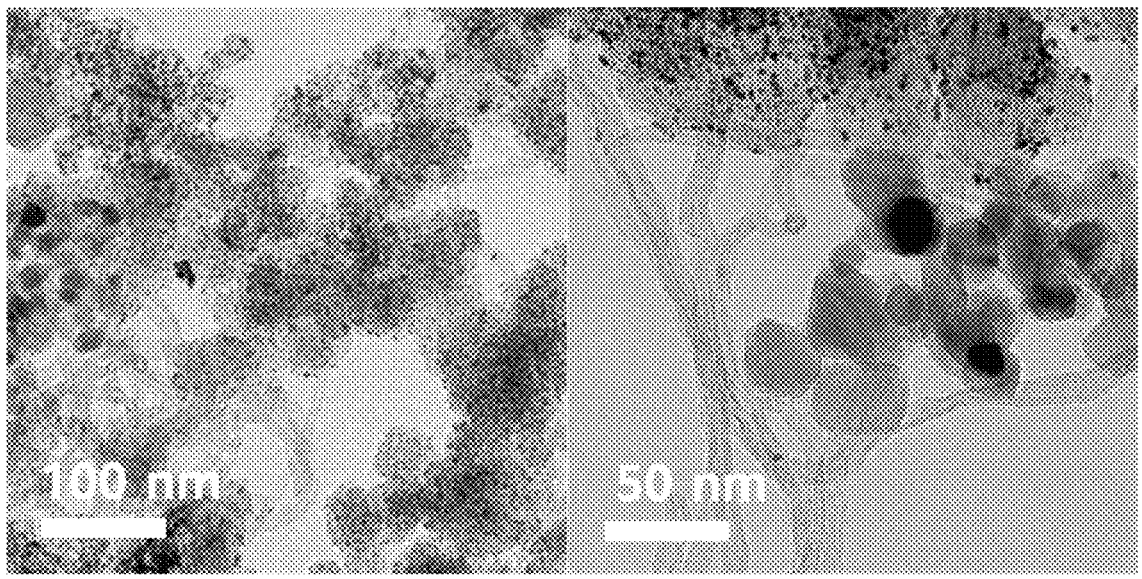
FIG. 1A shows TEM images showing the dispersion state of a catalyst slurry for a fuel cell formed in Example 4.

Several aspects and various embodiments of the present invention will now be described in more detail.

One aspect of the present invention provides a catalyst electrode for a fuel cell including a carbon support loaded with metal catalyst particles, an ionomer-ionomer support composite, and carbon materials selected from the group consisting of carbon nanotubes, carbon nanofibers, carbon nanorods, and mixtures thereof wherein the ionomer-ionomer support composite includes an ionomer support including a metal oxide and an ionomer covering the ionomer support.

A conventional fuel cell suffers from a rapid loss of performance with increasing number of cycles because metal catalyst particles and/or a carbon support are lost by degradation under specific operating conditions such as repetitive start up/shut down and a fuel starvation. Collapse of pores in a catalyst layer caused when the metal catalyst particles and/or the carbon support is degraded, surface hydrophilicity caused by oxidation of the support, flooding in the catalyst layer are known to be major causes of increased gas diffusion resistance of the fuel cell.

Particularly, since the performance of a fuel cell can be ensured only when electron, proton, and oxygen channels are stably formed in an oxygen electrode (cathode), it is common that a porous electrode structure is formed and an ionomer is contained therein to form proton channels.

However, a loss of the carbon support caused by degradation leads to collapse of the porous structure, which is the most fundamental problem because oxygen channels cannot be secured and the ionomer cannot serve to improve the proton conductivity.

The present inventors have found that the ionomer-ionomer support composite including the ionomer support can protect the porous structure of the electrode from collapsing due to carbon loss, unlike a conventional ionomer-containing catalyst electrode. The ionomer-ionomer support composite imparts durability to the porous structure of the catalyst electrode so that a substantial portion of the porous structure can be maintained even when carbon support is lost by repeated driving of the fuel cell. Simultaneously with this, the ionomer-ionomer support composite serves as an appropriate dispersant for the ionomer to accomplish two purposes: 1) good oxygen transmission and 2) improved proton conductivity. Moreover, the presence of the carbon materials selected from the group consisting of carbon nanotubes, carbon nanofibers, carbon nanorods, and mixtures thereof leads to improvements in structural stability and electrical conductivity of the catalyst electrode.

The carbon materials are preferably carbon nanotubes. The carbon materials serve to improve the electrical conductivity of the electrode due to their substantially high electrical conductivity. The carbon materials are arranged in random direction between the carbon support loaded with metal catalyst particles and the ionomer-ionomer support composite due to their small volume. This randomly directed arrangement is suitable to maintain the porous structure of the catalyst electrode to reduce the resistance to oxygen diffusion.

The metal oxide may be selected from the group consisting of $TiO_2$, $SnO_2$, and $CeO_2$. The metal oxide is preferably $TiO_2$ for its lowest price, which is advantageous in the commercialization of the catalyst electrode.

The ionomer may be Nafion.

The ionomer covering the ionomer support has a thickness of 0.5 to 10 nm, preferably 1 to 2 nm. If the thickness of the ionomer is less than 0.5 nm, the migration paths of protons in the electrode may be limited. Meanwhile, if the thickness of the ionomer exceeds 10 nm, the ionomer layer tends to aggregate, the oxygen transmission rate of the ionomer may drop significantly, and the excessively large volume of the ionomer may make it impossible to form the desired porous structure of the catalyst electrode.

The metal oxide has a diameter of 20 to 100 nm, preferably 20 to 30 nm. If the diameter of the metal oxide is less than 20 nm, the ionomer-ionomer support composite tends to aggregate when introduced into the catalyst electrode. Meanwhile, if the diameter of the metal oxide exceeds 100 nm, the decreased surface area may reduce the electrochemical active area of the catalyst electrode, resulting in a reduction in the catalyst utilization efficiency of the catalyst electrode. Particularly, the use of $TiO_2$ having a diameter in the range of 20 to 30 nm as the metal oxide is preferred in that the composite can be prevented from aggregating, a sufficient electrochemical active area of the catalyst electrode can be ensured, and the structure of the catalyst electrode can be stably maintained despite repeated use.

The metal catalyst may be selected from the group consisting of platinum, ruthenium, osmium, platinum-palladium, platinum-ruthenium alloys, platinum-cobalt alloys, platinum-nickel alloys, platinum-iridium alloys, platinum-osmium alloys, and mixtures thereof. Platinum is preferred.

The carbon support may be selected from the group consisting of Vulcan, carbon black, graphite carbon, acetylene black, ketjen black, carbon fiber, and mixtures thereof.

The ionomer-ionomer support composite may be present in an amount of 28 to 280 parts by weight, based on 100 parts by weight of the carbon support. If the content of the ionomer-ionomer support composite is less than 28 parts by weight, the pores of the catalyst electrode may not be effectively maintained. Meanwhile, if the content of the ionomer-ionomer support composite exceeds 280 parts by weight, the electrical conductivity of the electrode may be limited as a whole due to the low electrical conductivity of the ionomer support, the excessively increased volume of the ionomer-ionomer support composite may lead to an increase in the thickness of the electrode, and the pores of the catalyst electrode may be blocked when assembled, resulting in increased resistance to oxygen diffusion.

The ionomer-ionomer support composite is preferably present in an amount ranging from 28 to 70 parts by weight. Within this range, a desired I-V curve and a sufficient electrochemical active area of the electrode can be obtained and a significantly low ohmic resistance of the electrode can be measured after accelerated degradation test (ADT). Particularly, the ohmic resistance decreases slowly with increasing amount of the ionomer-ionomer support composite to 70 parts by weight, and thereafter, begins to increase rapidly with increasing amount of the ionomer-ionomer support composite. For this reason, the content of the ionomer-ionomer support composite is preferably limited to 28 to 70 parts by weight.

The carbon materials may be present in an amount ranging from 0.1 to 5.0% by volume, based on 100% by volume of the carbon support. Within this range, the I-V characteristics of the catalyst electrode after ADT can be improved. If the content of the carbon materials is less than 0.1% by volume, an improvement in the electrical conductivity of the catalyst electrode cannot be expected and the structure cannot be effectively prevented from collapsing due to carbon corrosion. Meanwhile, if the content of the carbon materials exceeds 5.0% volume, the carbon materials may aggregate in the electrode, making it difficult to exert their normal performance, and proton channels of the ionomer may be blocked, with the result that the utilization efficiency of the platinum catalyst is lowered, resulting in a reduction in electrochemical active area.

More preferably, the carbon materials are present in an amount ranging from 0.5 to 1.5% by volume, based on 100% by volume of the carbon support. Within this range, the initial I-V characteristics of the catalyst electrode and the I-V characteristics of the catalyst electrode after ADT can be improved compared to those of a commercial catalyst electrode including a Pt/C catalyst, the electrochemical active area of the catalyst electrode can reach a maximum, and the performance reduction and ohmic resistance of the catalyst electrode after ADT can be effectively minimized. Particularly, the initial I-V characteristics of the catalyst electrode tend to be improved with increasing amount of the carbon materials within the above-defined range, and thereafter, begin to decrease rapidly outside the above-defined range. For this reason, the content of the carbon materials is preferably limited to the range of 0.5 to 1.5 parts by volume.

Moreover, the initial oxygen gain of the catalyst electrode within the above-defined range is low compared to that outside the above-defined range. The initial oxygen gain is indicative of oxygen transmission. Particularly, the oxygen gain of the catalyst electrode is lower than that of a commercial catalyst electrode including a Pt/C catalyst, indicating improved gas diffusion in the electrode within the above-defined range. The oxygen gain of a commercial catalyst electrode including a Pt/C catalyst after ADT tends to increase significantly whereas the oxygen gain of the electrode including the ionomer support and the carbon materials after ADT tends to decrease.

Although explicitly described in the Examples section that follows, it was found that it is important for the catalyst electrode of the present invention to meet the following conditions: (i) the metal oxide is $TiO_2$, (ii) the diameter of the $TiO_2$ is 20 to 30 nm, (iii) the ionomer-ionomer support composite is present in an amount of 28 to 70 parts by weight, based on 100 parts by weight of the carbon support loaded with the metal catalyst particles, and (iv) the carbon materials are present in an amount of 0.5 to 1.5% by volume, based on 100% by volume of the carbon support.

When the conditions (i) to (iv) were all met, the reduction rate of the oxygen gain of the catalyst electrode after ADT tends to increase with increasing content of the carbon materials. If one or more of the conditions (i) to (iv) were not met, the reduction rate of the oxygen gain of the catalyst electrode after ADT tends to decrease. In this regard, it is important to meet all of the conditions in order to maximize the desired effects of the present invention.

A further aspect of the present invention provides a method for fabricating a catalyst electrode for a fuel cell, including (a) preparing a mixed solution containing a metal oxide and an ionomer, (b) stirring and drying the mixed solution to prepare an ionomer-ionomer support composite, (c) adding the ionomer-ionomer support composite, carbon materials, and a carbon support loaded with metal catalyst particles to a solvent, followed by mixing to form an electrode slurry, and (d) fabricating a catalyst electrode using the electrode slurry wherein the carbon materials are selected from the group consisting of carbon nanotubes, carbon nanofibers, carbon nanorods, and mixtures thereof.

The carbon materials are preferably carbon nanotubes.

The ionomer may be Nafion.

Step (a) may include (a-1) preparing a first mixed solution containing a metal oxide, (a-2) preparing a second mixed solution containing an ionomer, and (a-3) mixing the first mixed solution with the second mixed solution. The mixed solution prepared by mixing the first mixed solution containing a metal oxide with the second mixed solution containing an ionomer in step (a) is preferred in terms of dispersibility over a mixed solution prepared by adding a mixture of a metal oxide and an ionomer to a solvent.

In step (a), the metal oxide may be mixed with the ionomer in such amounts that the volume ratio is in the range of 1:0.3-2.0, preferably 1:0.5-1.0. If the proportion of the ionomer is outside the above-defined range, an excessively thick coating layer may be formed or the ionomer acting as a binder may aggregate.

The metal oxide may be selected from the group consisting of $TiO_2$, $SnO_2$, $CeO_2$, and mixtures thereof. The diameter of the metal oxide may be 20 to 100 nm, preferably 20 to 30 nm. Effects related to the type and diameter of the metal oxide are the same as described above for the catalyst electrode and a detailed description thereof is thus omitted.

The mixed solution prepared in step (a) has a pH of 1 to 5, which is preferable in terms of dispersibility. The pH of the mixed solution is preferably 2 to 3 at which the highest dispersibility of the mixed solution is attained.

The solvent of the mixed solution may be selected from isopropyl alcohol, ethanol, and mixtures thereof.

The mixed solution may be dried at 50 to 200° C. for 10 to 24 hours.

Step (c) may include (c-1) sonicating a third mixed solution containing the ionomer-ionomer support composite and the carbon materials for 1 to 300 minutes and sonicating a fourth mixed solution containing a carbon support loaded with metal catalyst particles for 1 to 300 minutes and (c-2) mixing the third mixed solution with the fourth mixed solution and sonicating the mixture for 1 to 300 minutes to form an electrode slurry. The ionomer-ionomer support composite and the carbon materials can be uniformly dispersed without aggregation in the electrode slurry.

In step (c), the ionomer-ionomer support composite may be added in an amount of 2.5 to 6.5% by volume, based on the carbon support loaded with metal catalyst particles. If the amount of the ionomer-ionomer support composite is less than 2.5% by volume, the pores of the catalyst electrode may not be effectively maintained. Meanwhile, if the amount of the ionomer-ionomer support composite exceeds 6.5% by volume, the electrical conductivity of the electrode may be limited as a whole due to the low electrical conductivity of the ionomer support, the excessively increased volume of the electrode may lead to an increase in the thickness of the electrode, and the pores of the catalyst electrode may be blocked when assembled, resulting in increased resistance to oxygen diffusion.

More preferably, the ionomer-ionomer support composite is added in an amount ranging from 5.0 to 6.5% by volume. Within this range, a desired I-V curve and a sufficient electrochemical active area of the catalyst electrode can be obtained and a significantly low ohmic resistance of the catalyst electrode can be measured after accelerated degradation test (ADT). Particularly, the ohmic resistance decreases slowly with increasing amount of the ionomer-ionomer support composite to the upper limit defined above, and thereafter, begins to increase rapidly with increasing amount of the ionomer-ionomer support composite. For this reason, the content of the ionomer-ionomer support composite is preferably limited to 5.0 to 6.5 parts by weight.

In step (c), the carbon materials may be added in an amount ranging from 0.1 to 5.0% by volume, based on the carbon support loaded with metal catalyst particles. Within this range, the I-V characteristics of the catalyst electrode after ADT can be improved. If the content of the carbon materials is less than 0.1% by volume, an improvement in the electrical conductivity of the catalyst electrode cannot be expected and the structure cannot be effectively prevented from collapsing due to carbon corrosion. Meanwhile, if the content of the carbon materials exceeds 5.0% volume, the carbon materials may aggregate in the electrode, making it difficult to exert their normal performance, and proton channels of the ionomer may be blocked, with the result that the utilization efficiency of the platinum catalyst is lowered, resulting in a reduction in electrochemical active area.

More preferably, in step (c), the carbon materials are added in an amount ranging from 0.5 to 1.5% by volume, based on 100% by volume of the carbon support loaded with metal catalyst particles. Within this range, the initial I-V characteristics of the catalyst electrode and the I-V characteristics of the catalyst electrode after ADT can be improved compared to those of a commercial catalyst electrode including a Pt/C catalyst, the electrochemical active area of the catalyst electrode can reach a maximum, and the performance reduction and ohmic resistance of the catalyst electrode after ADT can be effectively minimized. Particularly, the initial I-V characteristics of the catalyst electrode tend to be improved with increasing amount of the carbon materials within the above-defined range, and thereafter, begin to decrease rapidly outside the above-defined range. For this reason, the content of the carbon materials is preferably limited to the range of 0.5 to 1.5 parts by volume.

Although explicitly described in the Examples section that follows, catalyst electrodes for fuel cells were fabricated by varying the order of preparing the mixed solution containing the metal oxide and the ionomer, the volume ratio between the metal oxide and the ionomer in the mixed solution, the type and diameter of the metal oxide, the type of the ionomer, the pH of the mixed solution, the solvent of the mixed solution, the drying temperature and time, the content of the ionomer-ionomer support composite, and the type and content of the carbon materials; and the surfaces of the catalyst electrodes were observed by high-magnification TEM.

As a result, when the following conditions (i) to (vii) were all met, the ionomer support was completely surrounded by the ionomer and the ionomer layer was uniformly formed to the most preferred thickness of 1 to 2 nm, as determined by high-magnification TEM, unlike when other conditions and numerical ranges were employed: (i) step (a) includes (a-1) preparing a first mixed solution containing a metal oxide, (a-2) preparing a second mixed solution containing an ionomer, and (a-3) mixing the first mixed solution with the second mixed solution, (ii) the metal oxide and the ionomer are present in a volume ratio of 1:0.5-1.0 in the mixed solution, (iii) the metal oxide is $TiO_2$, (iv) the diameter of the metal oxide is 20 to 30 nm, (v) the pH of the mixed solution is 2 to 3, (vi) the solvent of the mixed solution is isopropyl alcohol, and (vii) the mixed solution is dried at a temperature of 50 to 200° C. for 10 to 24 hours.

If one or more of the conditions (i) to (vii) were not met, the ionomer support was not completely surrounded by the ionomer and was partially exposed or the ionomer layer was non-uniformly formed to a large thickness ($\geq 2$ nm) and its aggregation was observed.

Another aspect of the present invention provides a fuel cell including the catalyst electrode.

The following examples are provided to assist in further understanding of the present invention. However, these examples are provided for illustrative purposes only and the scope of the present invention is not limited thereto. It will be evident to those skilled in the art that various modifications and changes can be made without departing from the scope and spirit of the present invention.

Example 1. Production of Catalyst Electrode for Fuel Cell (PNTC0.5)

Preparation of Ionomer-Ionomer Support Composite $TiO_2$ and an ionomer (Nafion) in a volume ratio of 1:0.5-1.0 were separately dispersed in isopropyl alcohol. Each of the mixed solutions was dispersed by sonication for 10 min. The $TiO_2$-containing mixed solution was adjusted to pH 2-3 by the addition of 1 M perchloric acid. The pH-adjusted $TiO_2$-containing mixed solution was mixed with the ionomer-containing mixed solution, followed by additional sonication for 30 min. After sonication, the resulting mixed solution was dried in a vacuum oven at 80° C. for 24 h to prepare an ionomer-ionomer support composite.

Fabrication of Catalyst Electrode for Fuel Cell

A predetermined amount of the ionomer-ionomer support composite was dispersed in isopropyl alcohol with a magnetic bar for 3 h, and further dispersed by sonication for 30 min ("mixed solution 1"). Highly electrically conductive carbon materials (carbon nanotubes) and a carbon support loaded with metal catalyst particles were dispersed in isopropyl alcohol with a magnetic bar for 3 h and further dispersed by sonication for 30 min ("mixed solution 2"). The carbon materials were used in an amount of 0.5 vol % with respect to the volume of the carbon support. The mixed solution 1 was mixed with the mixed solution 2. The mixture was dispersed by sonication for 30 min ("mixed solution 3"). A commercial Pt/C catalyst (46.5 wt %, TKK) was dispersed in a mixed solvent of distilled water and isopropyl alcohol and then a predetermined amount of an ionomer was added thereto ("mixed solution 4"). The mixed solution 4 was dispersed by sonication for 30 min, mixed with the mixed solution 3, and further dispersed by sonication for 30 min. The resulting slurry was uniformly applied to one side of a polymer electrolyte membrane using a sprayer until the platinum loading reached a predetermined level (0.4 $mg_{Pt}$ $cm^{-2}$). This compartment corresponds to a cathode of a fuel cell membrane electrode assembly.

A commercial Pt/C catalyst (46.5 wt %, TKK) and an ionomer were dispersed in a mixed solvent of distilled water and isopropyl alcohol by sonication for 30 min. The dispersion was uniformly applied to the opposite side of the polymer electrolyte membrane using a sprayer until the platinum loading reached a predetermined level (0.2 $mg_{Pt}$ $cm^{-2}$). This compartment corresponds to an anode of the fuel cell membrane electrode assembly.

Example 2. Production of Catalyst Electrode for Fuel Cell (PNTC1.25)

A catalyst electrode for a fuel cell was fabricated in the same manner as in Example 1, except that the carbon materials were used in an amount of 1.25 vol % with respect to the volume of the carbon support loaded with metal catalyst particles.

Example 3. Production of Catalyst Electrode for Fuel Cell (PNTC2.5)

A catalyst electrode for a fuel cell was fabricated in the same manner as in Example 1, except that the carbon materials were used in an amount of 2.5 vol % with respect to the volume of the carbon support loaded with metal catalyst particles.

Example 4. Production of Catalyst Electrode for Fuel Cell (PNTC5.0)

A catalyst electrode for a fuel cell was fabricated in the same manner as in Example 1, except that the carbon materials were used in an amount of 5.0 vol % with respect to the volume of the carbon support loaded with metal catalyst particles.

Comparative Example 1. Production of Catalyst Electrode for Fuel Cell Using Commercial Catalyst (Pt/C)

A commercial Pt/C catalyst (46.5 wt %, TKK) and a predetermined amount of an ionomer were dispersed in a mixed solvent of distilled water and isopropyl alcohol by sonication for 30 min. The resulting catalyst slurry was uniformly applied to one side of a polymer electrolyte membrane using a sprayer until the platinum loading reached a predetermined level (0.4 $mg_{Pt}$ $cm^{-2}$) This compartment corresponds to a cathode of a fuel cell membrane electrode assembly. The catalyst slurry was uniformly applied to the opposite side of the polymer electrolyte membrane until the platinum loading reached a predetermined level (0.2 $mg_{Pt}$ $cm^{-2}$). This compartment corresponds to an anode of the fuel cell membrane electrode assembly.

Experimental Example 1. HR-TEM and SEM Analyses

The catalyst electrodes for fuel cells fabricated in Examples 1-4 and Comparative Example 1 were analyzed by TEM.

Figure 1B:
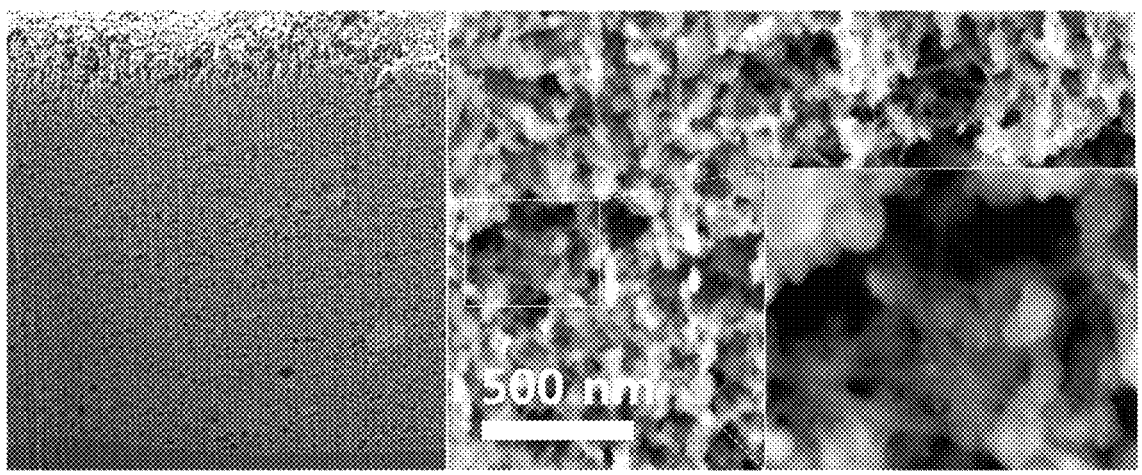
FIG. 1B shows FIB-SEM images showing the porous structure of an electrode fabricated from the catalyst slurry using an ultrasonic sprayer.
Figure 1C:
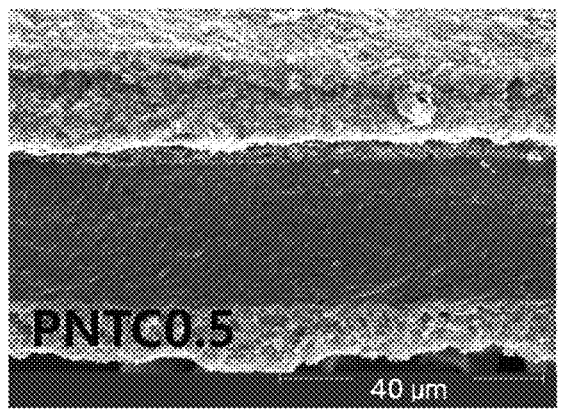
FIG. 1C shows FE-SEM images showing the thicknesses of electrodes for fuel cells fabricated in Examples 1-4.
Figure 1C:
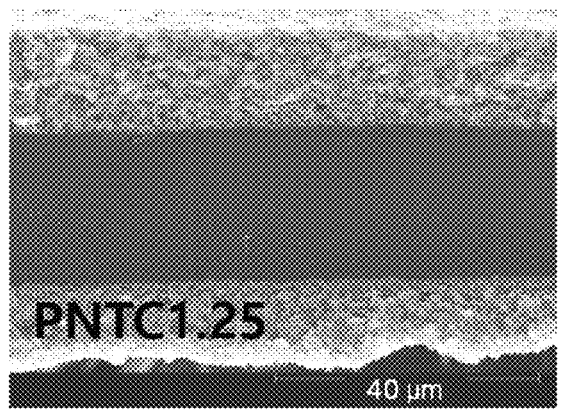
Figure 1C:
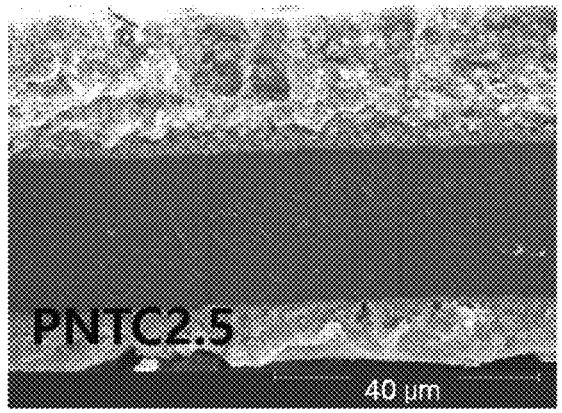
Figure 1C:
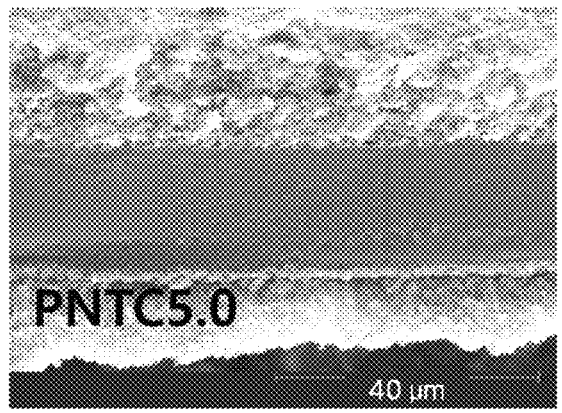
Figure 2:
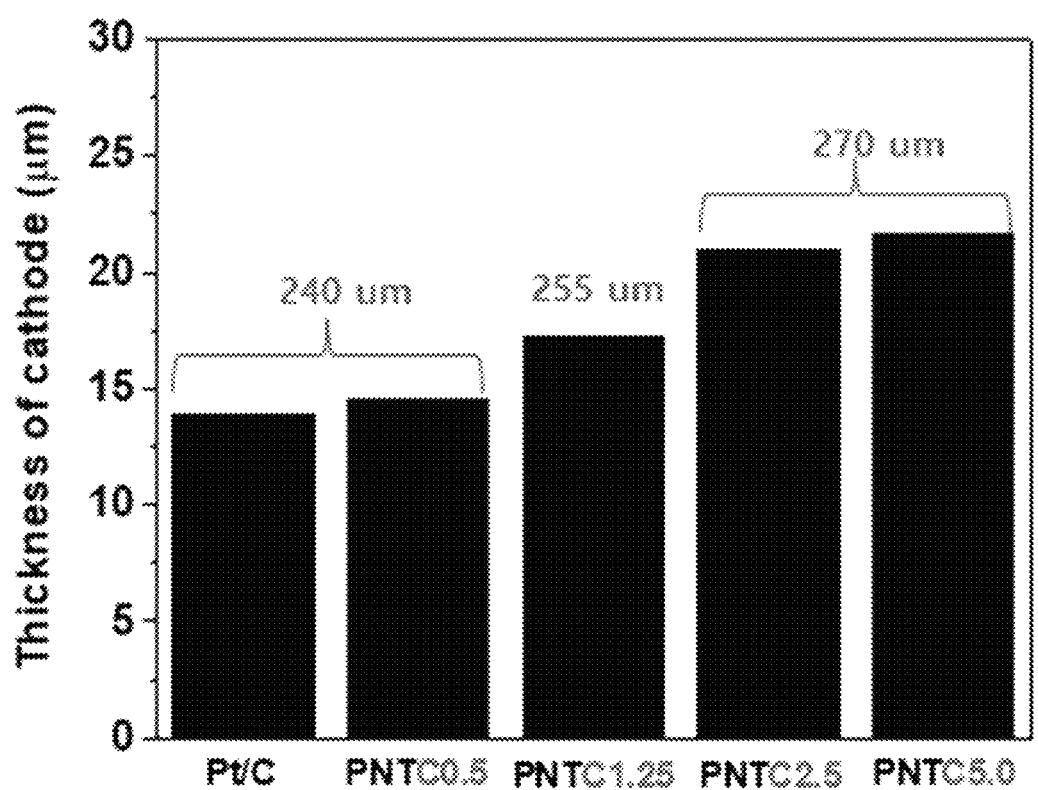
FIG. 2 compares the thicknesses of electrodes for fuel cells fabricated in Examples 1-4 and Comparative Example 1.

FIG. 1A shows TEM images showing the dispersion state of the cathode catalyst slurry formed in Example 4, FIG. 1B shows FIB-SEM images showing the porous structure of the electrode produced from the catalyst slurry using an ultrasonic sprayer, and FIG. 1C shows FE-SEM images showing the thicknesses of the electrodes fabricated in Examples 1-4. FIG. 2 shows the thicknesses of the electrodes produced in Examples 1-4 and Comparative Example 1.

The images of FIGS. 1A, 1B, and 2 reveal that the ionomer-ionomer support composite, the carbon materials, and the commercial Pt/C catalyst were uniformly dispersed in the slurries. Each of the electrodes had a well-defined porous structure. The use of the carbon materials led to an increase in the thickness of the cathode. The thickness of the cathode was increased by a maximum of ≥7 μm with increasing volume of the carbon materials.

Experimental Example 2. Measurement of I-V Characteristics and Durability

A single cell including each of the catalyst electrodes prepared in Examples 1-4 and Comparative Example 1 was fabricated and evaluated for electrochemical properties.

Specifically, the single cell was fabricated by assembling a Teflon gasket and a gas diffusion layer (GDLs) on each of the anode and the cathode under a predetermined pressure. The gas diffusion layer consisted of carbon paper and a microporous layer formed on the carbon paper. The thickness of the gasket assembled on the cathode was changed to 240, 255, and 270 μm depending on the thickness of the cathode such that the same compressibility at the cathode was maintained. The compressibility at the cathode was found to be ~1%.

The I-V characteristics of the single cell including the catalyst electrode fabricated in each of Examples 1-4 and Comparative Example 1 were measured before and after ADT to find an optimal content of the carbon materials. The measurement was done at 80° C., 1.8 bar, and 100% RH under $H_2$/Air atmosphere. The ADT was conducted at 80° C., 10 bar, and 100% RH under $H_2$/Air atmosphere by applying a voltage of 1.3 V to the cell for 10 h.

Figure 3A:
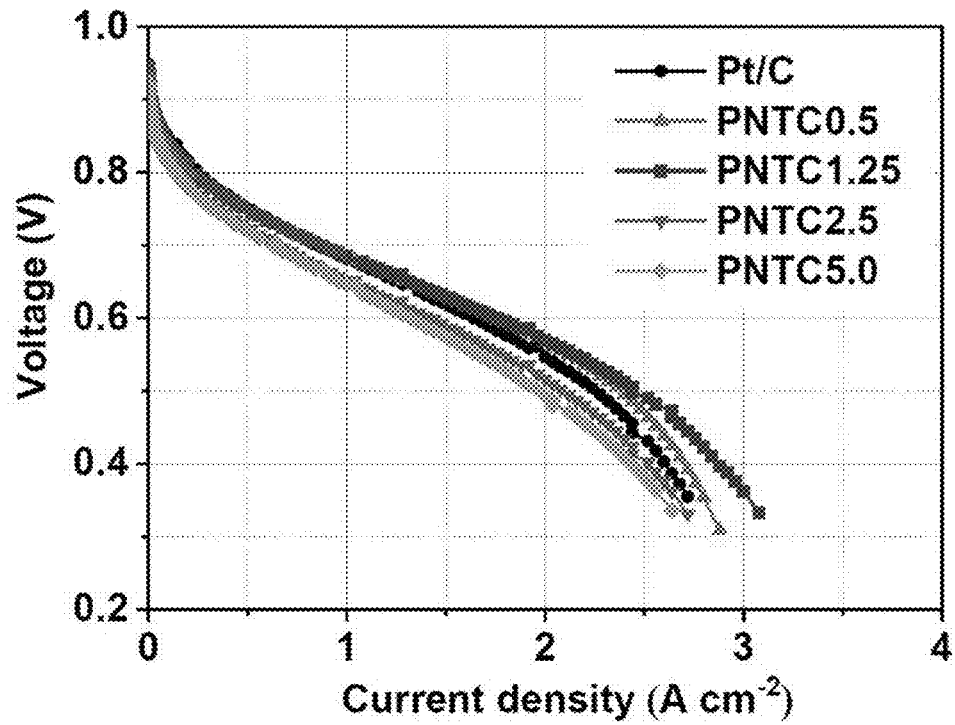
FIG. 3A shows the I-V characteristics of catalyst electrodes for fuel cells fabricated in Examples 1-4 and Comparative Example 1 before ADT.
Figure 3B:
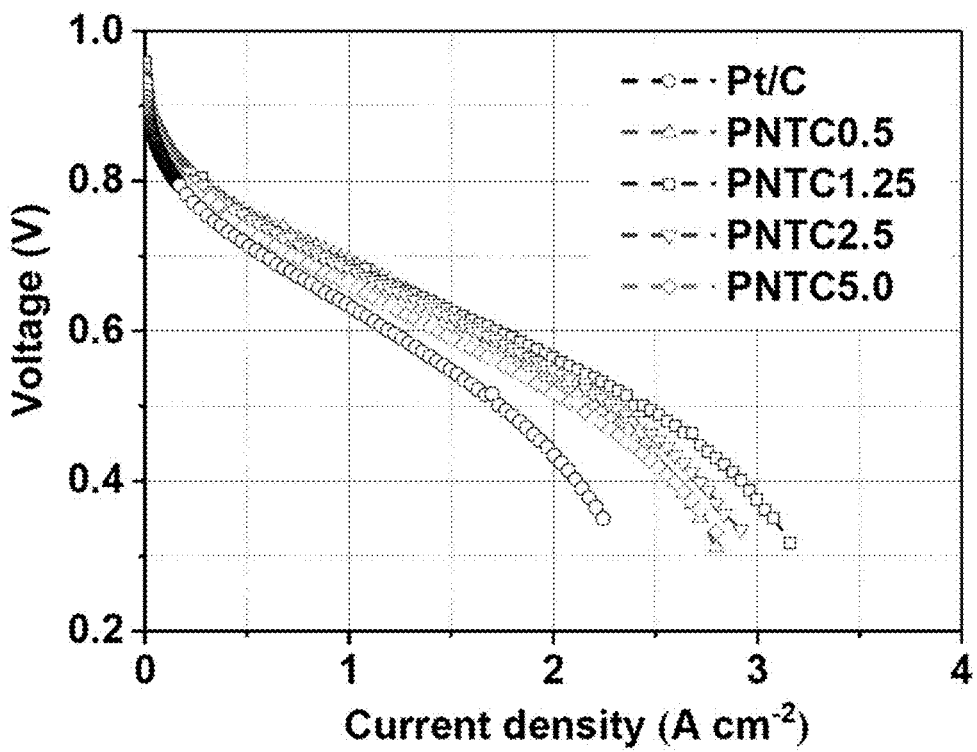
FIG. 3B shows the I-V characteristics of the catalyst electrodes after ADT.
Figure 3C:
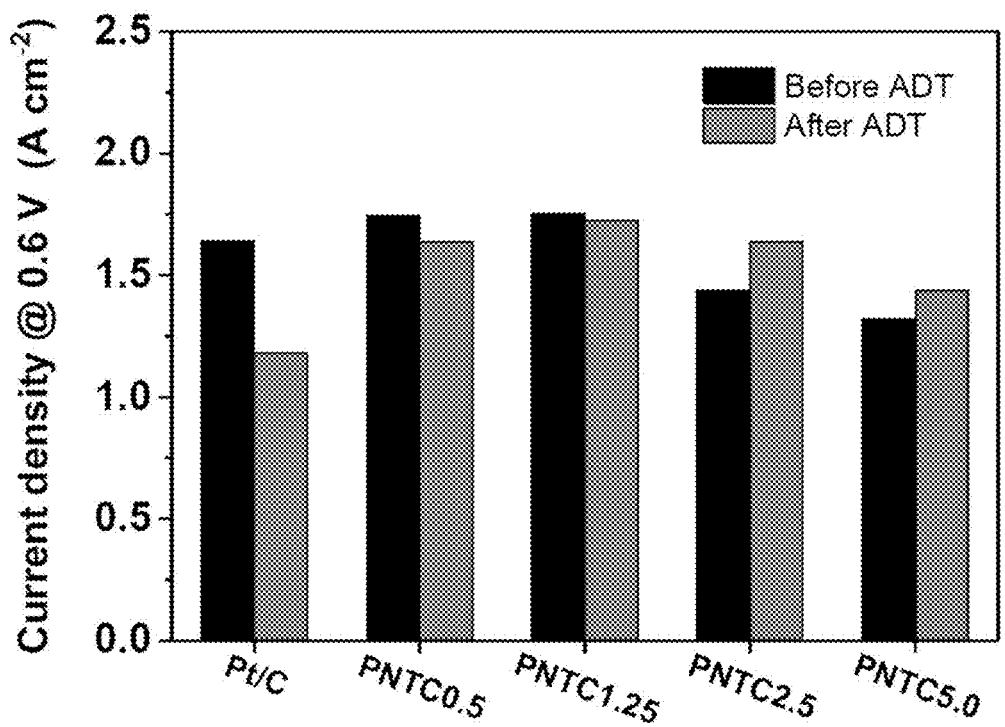
FIG. 3C shows changes in the current densities measured at 0.6 V before and after ADT in FIGS. 3A and 3B.
Figure 3D:
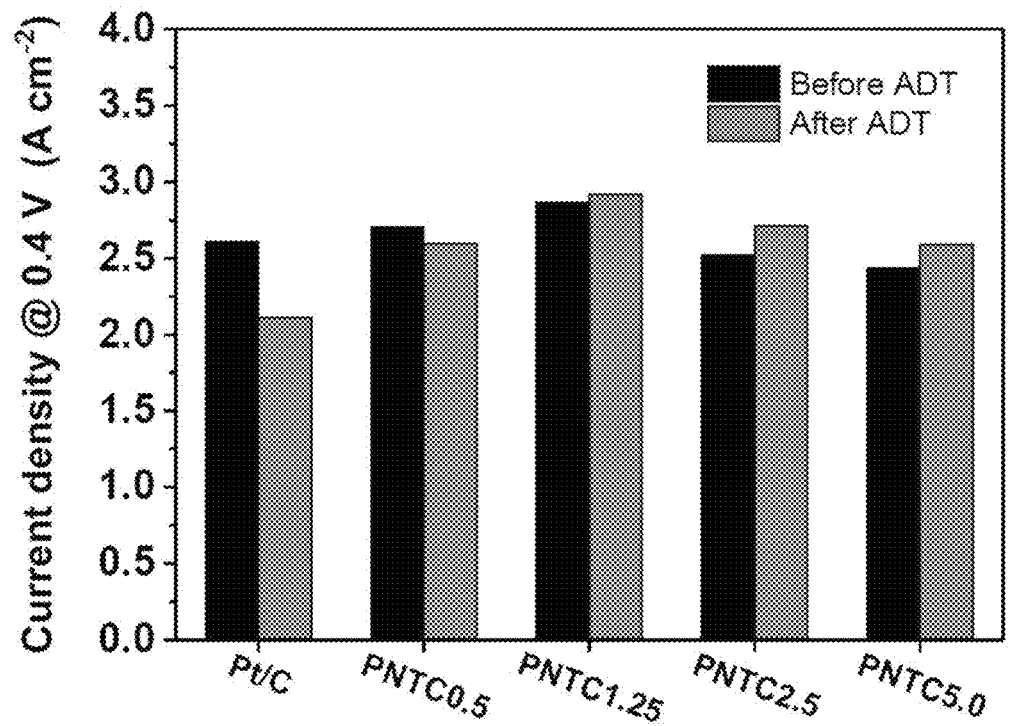
FIG. 3D shows changes in the current densities measured at 0.4 V, where resistance to gas diffusion predominantly affects, before and after ADT in FIGS. 3A and 3B.

FIG. 3A shows the I-V characteristics of the catalyst electrodes fabricated in Examples 1-4 and Comparative Example 1 before ADT, FIG. 3B shows the I-V characteristics of the catalyst electrodes after ADT, FIG. 3C shows changes in the current densities measured at 0.6 V before and after ADT in FIGS. 3A and 3B, and FIG. 3D shows changes in the current densities measured at 0.4 V, where resistance to gas diffusion predominantly affects, before and after ADT in FIGS. 3A and 3B.

As shown in FIGS. 3A to 3D, the performance characteristics of the catalyst electrodes of Examples 1 and 2 before ADT were improved compared to those of the catalyst electrode of Comparative Example 1 with increasing content (vol %) of the carbon materials, but the performance characteristics of the catalyst electrodes of Examples 3 and 4 before ADT were limited despite increasing amount (vol %) of the carbon materials. The performance characteristics of the catalyst electrodes of Examples 1-4 before ADT were improved compared to those of the catalyst electrode of Comparative Example 1. The performance characteristics of the catalyst electrodes of Examples 1 and 2 after ADT were improved compared to those before ADT, demonstrating that the performance characteristics of the catalyst electrodes were limited before ADT. Particularly, the catalyst electrode of Example 2 showed the highest performance before ADT and underwent the least reduction in performance after ADT, demonstrating that the content of the carbon materials in the catalyst electrode was most preferred. This difference was more pronounced at 0.4 V, where resistance to gas diffusion predominantly affects.

Experimental Example 3. Measurement of Electrochemical Active Surface Area (ECSA) Values The electrochemical active surface area (ECSA) values of the single cell including the catalyst electrode fabricated in each of Examples 1-4 and Comparative Example 1 were measured before and after ADT to find an optimal content of the carbon materials.

Figure 4:
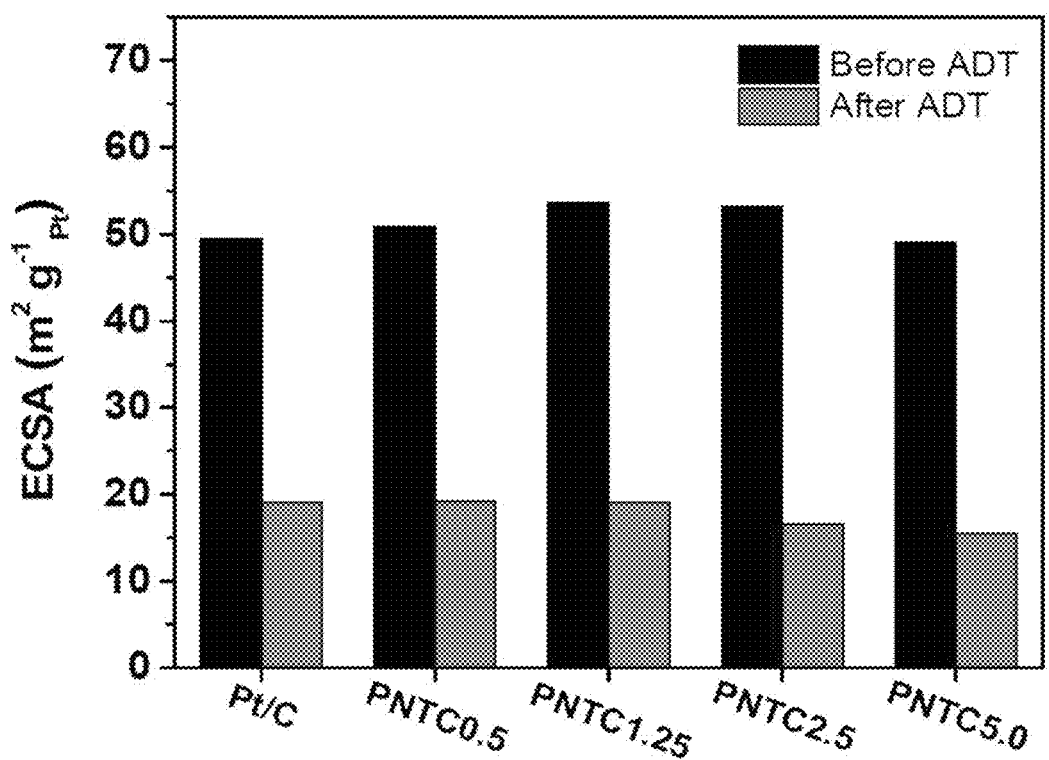
FIG. 4 shows the ECSA values of catalyst electrodes for fuel cells fabricated in Examples 1-4 and Comparative Example 1 before and after ADT.

FIG. 4 shows the ECSA values of catalyst electrodes fabricated in Examples 1-4 and Comparative Example 1 before and after ADT.

As shown in FIG. 4, the ECSA values of the catalyst electrodes of Examples 1-4 showed a tendency to be substantially higher than that of the catalyst electrode of Comparative Example 1 due to the increased electrical conductivities by the use of the carbon materials, but the ECSA values of the catalyst electrodes of Examples 3 and 4 showed a tendency to gradually decrease with increasing content of the carbon materials. These results demonstrate that the excess carbon materials aggregated in the electrodes to block channels in the ionomer, limiting the migration of protons, and as a result, the utilization efficiency of the platinum catalyst is lowered, resulting in a reduction in electrochemical active area.

Experimental Example 4. Measurement of Resistances

The resistances of the catalyst electrodes of Examples 1-4 and Comparative Example 1 were measured.

Figure 5A:
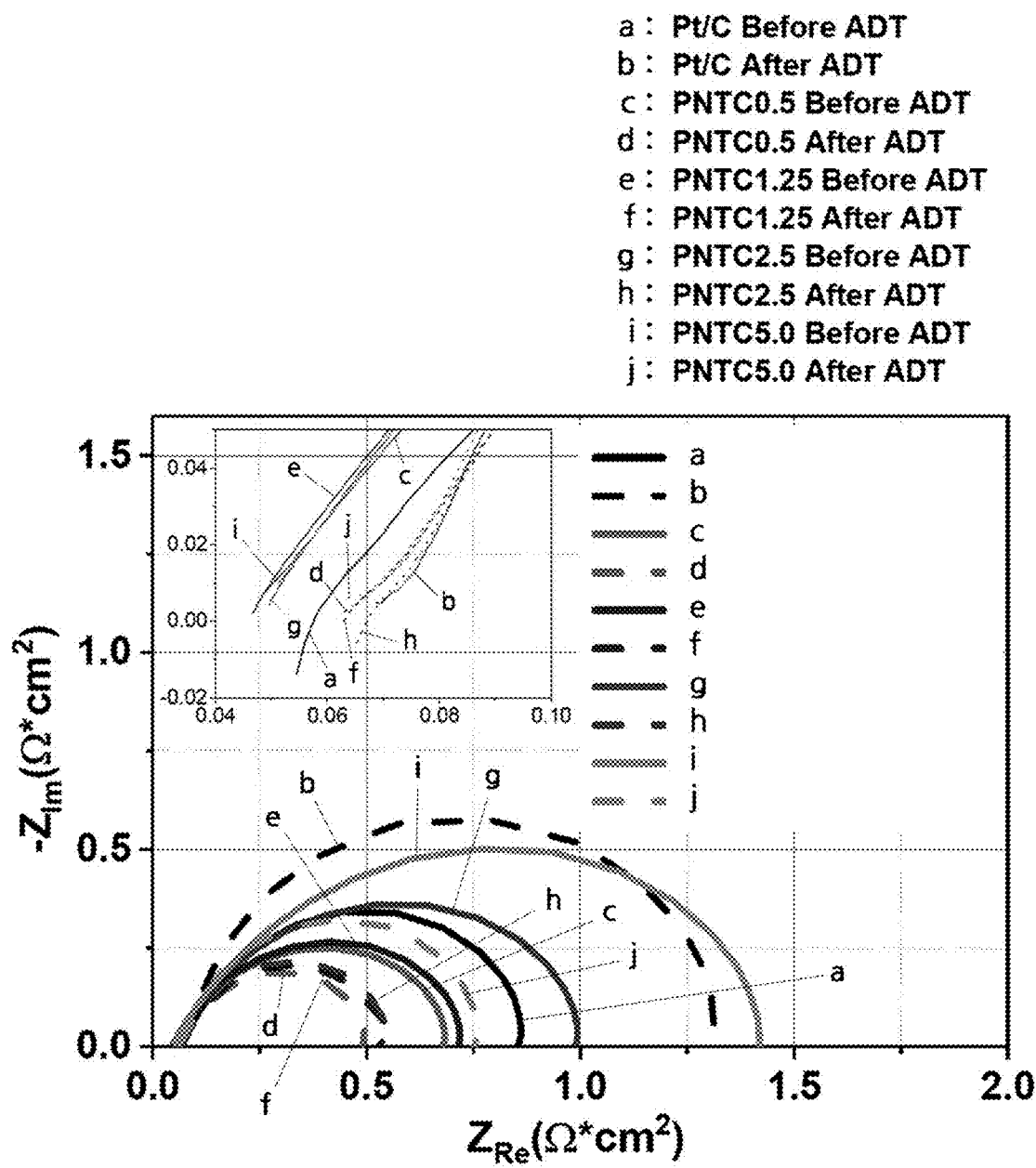
FIG. 5A shows Nyquist plots of catalyst electrodes for fuel cells fabricated in Examples 1-4 and Comparative Example 1 before and after ADT and FIG. 5B shows the ohmic resistances and charge transfer resistances of the catalyst electrodes before and after ADT.
Figure 5B:
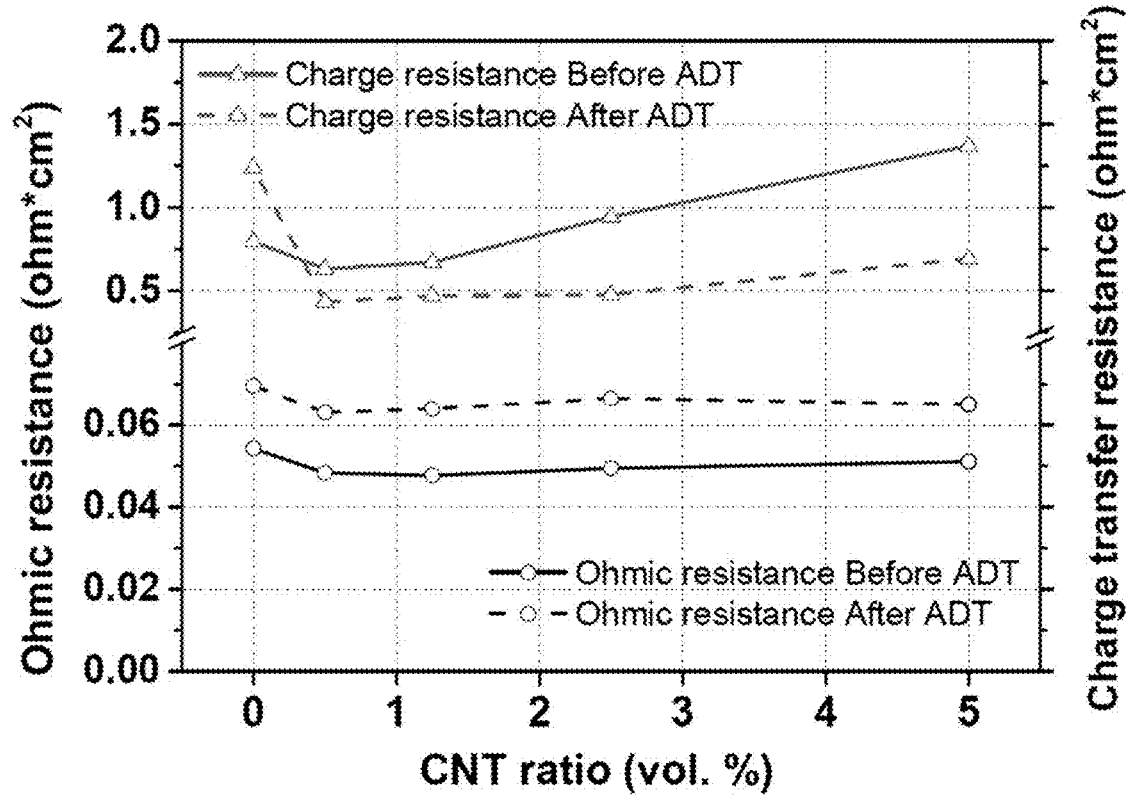

FIG. 5A shows Nyquist plots of the catalyst electrodes fabricated in Examples 1-4 and Comparative Example 1 before and after ADT and FIG. 5B shows the ohmic resistances and charge transfer resistances of the catalyst electrodes before and after ADT.

As shown in FIGS. 5A and 5B, the ohmic resistances of the electrodes of Examples 1-4 were lower than that of the electrode of Comparative Example 1. This is believed to be because the use of the carbon materials substantially improved the conductivities of the electrodes. The ohmic resistance showed a tendency to increase in almost the same rate after ADT due to carbon corrosion. In contrast, the charge transfer resistances of the catalyst electrodes of Examples 1 and 2 were lower than those of the catalyst electrode of Comparative Example 1 but showed a tendency to rapidly increase with increasing proportion of the carbon materials. This is believed to be because the excess carbon materials blocked channels in the ionomer to limit the migration of protons, as demonstrated in Experimental Example 3. The structure of the catalyst electrode of Comparative Example 1 collapsed and the ionomer aggregated due to carbon corrosion after ADT, resulting in a significant increase in the charge transfer resistance of the catalyst electrode. In contrast, the charge transfer resistances of the catalyst electrodes of Examples 1-4 showed a tendency to decrease due to arrangement of the ionomer during carbon corrosion.

Experimental Example 5. Measurement of Oxygen Gains

The oxygen gains of the single cells fabricated using the catalyst electrodes of Examples 1-4 and Comparative Example 1 were measured before and after ADT to investigate the oxygen transmission rates of the catalyst electrodes.

Figure 6A:
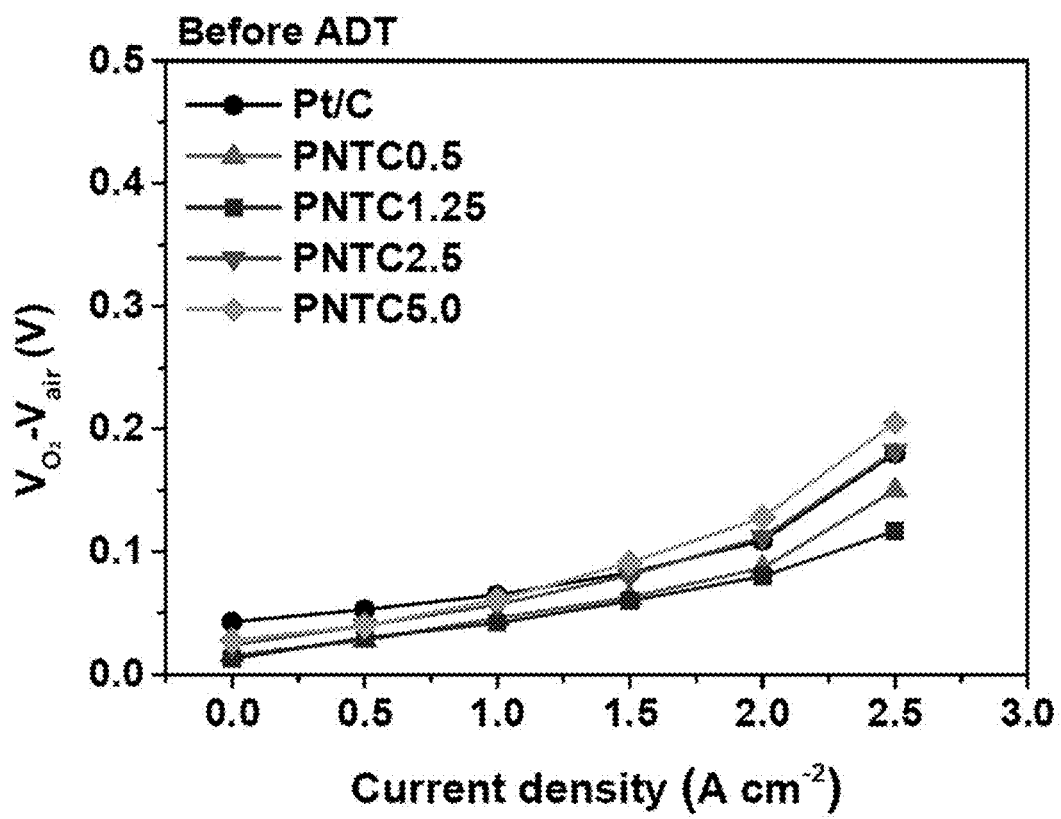
FIG. 6A shows the initial oxygen gains (before ADT) of catalyst electrodes for fuel cells fabricated in Examples 1-4 and Comparative Example 1.
Figure 6B:
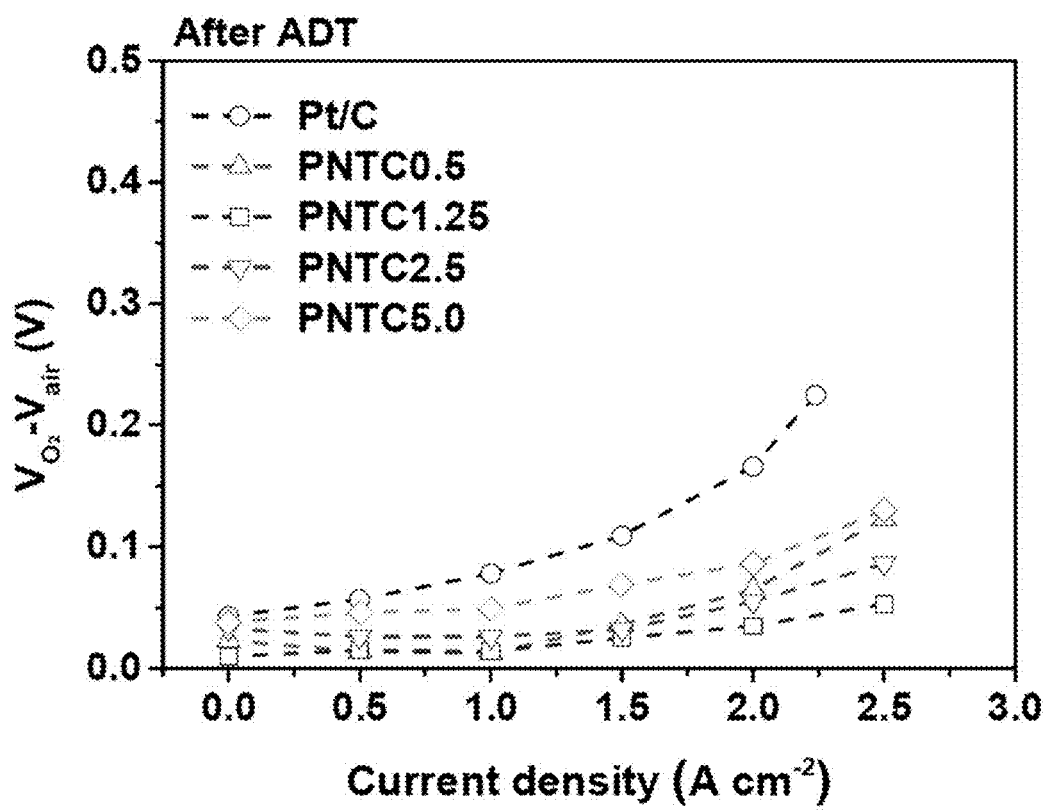
FIG. 6B shows the oxygen gains of the catalyst electrodes after ADT.
Figure 6C:
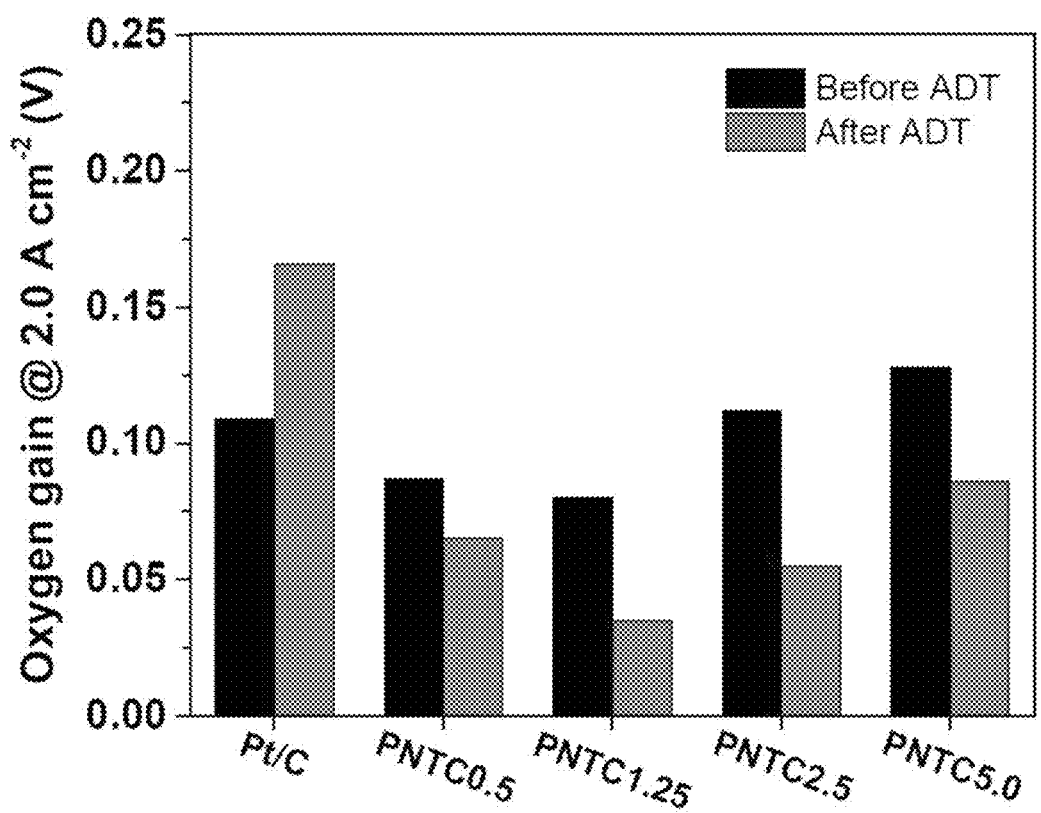
FIG. 6C shows changes in the oxygen gains of the catalyst electrodes measured before and after ADT in FIGS. 6A and 6B.

FIG. 6A shows the initial oxygen gains (before ADT) of the catalyst electrodes fabricated in Examples 1-4 and Comparative Example 1, FIG. 6B shows the oxygen gains of the catalyst electrodes after ADT, and FIG. 6C shows changes in the oxygen gains of the catalyst electrodes measured before and after ADT in FIGS. 6A and 6B.

As shown in FIGS. 6A to 6C, the oxygen gains of the electrodes using the carbon materials before ADT were found to be substantially lower than those of the electrode of Comparative Example 1, indicating improved gas diffusion in the electrodes of Examples 1-4. The oxygen gains of the catalyst electrodes of Examples 1 and 2 were much lower than those of the catalyst electrode of Comparative Example 1 but the oxygen gains of the catalyst electrodes of Examples 3 and 4 were comparable to or slightly higher than those of the catalyst electrode of Comparative Example 1. This is believed to be because the excess carbon materials made the electrodes thick to cause deterioration of gas diffusion. The oxygen gains of the catalyst electrode of Comparative Example 1 after ADT were much higher than those before ADT, whereas the oxygen gains of the catalyst electrodes of Examples 1-4 after ADT were lower than those before ADT, which seems to be because the porous structures of the catalyst electrodes were maintained during the carbon corrosion and the use of the carbon materials to secure a larger number of gas channels after ADT than before ADT. Particularly, the oxygen gains of the catalyst electrode of Example 2 both before and after ADT were lower than those of the other catalyst electrodes. In conclusion, the content of the carbon materials in the catalyst electrode of Example 2 is most preferred.

Experimental Example 6. SEM Analysis

Figure 7A:
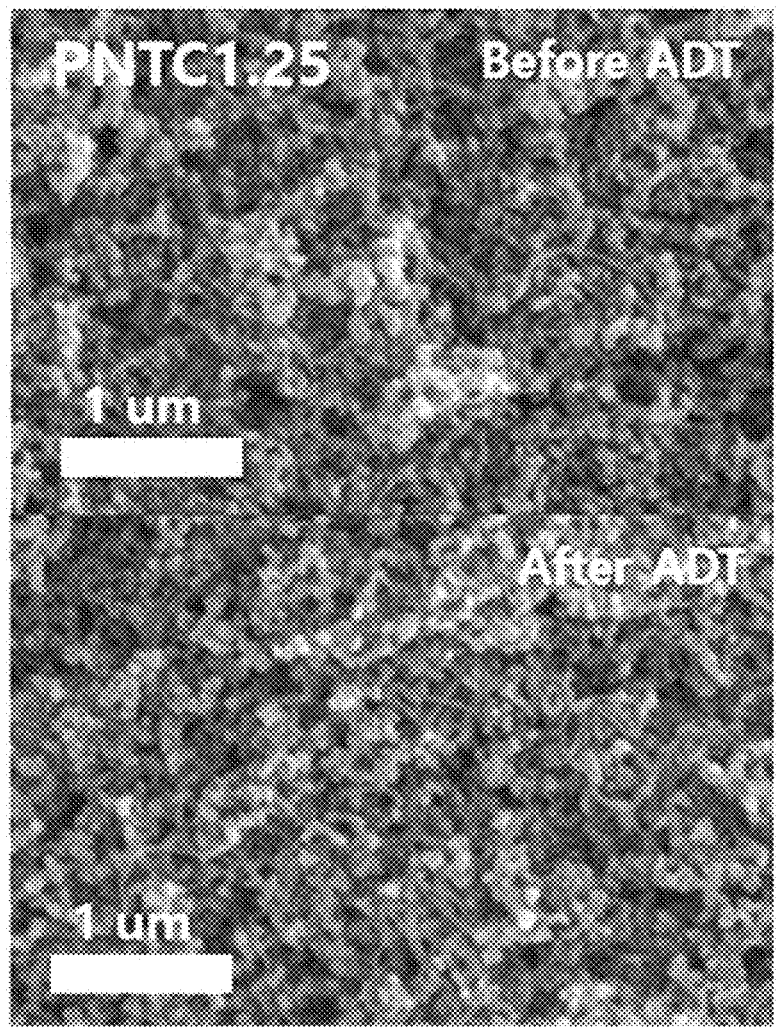
FIG. 7A shows surface FE-SEM images of a catalyst electrode for a fuel cell produced in Example 2 before and after ADT and FIG. 7B shows surface FE-SEM images of a catalyst electrode for a fuel cell fabricated in Comparative Example 1 before and after ADT.
Figure 7B:
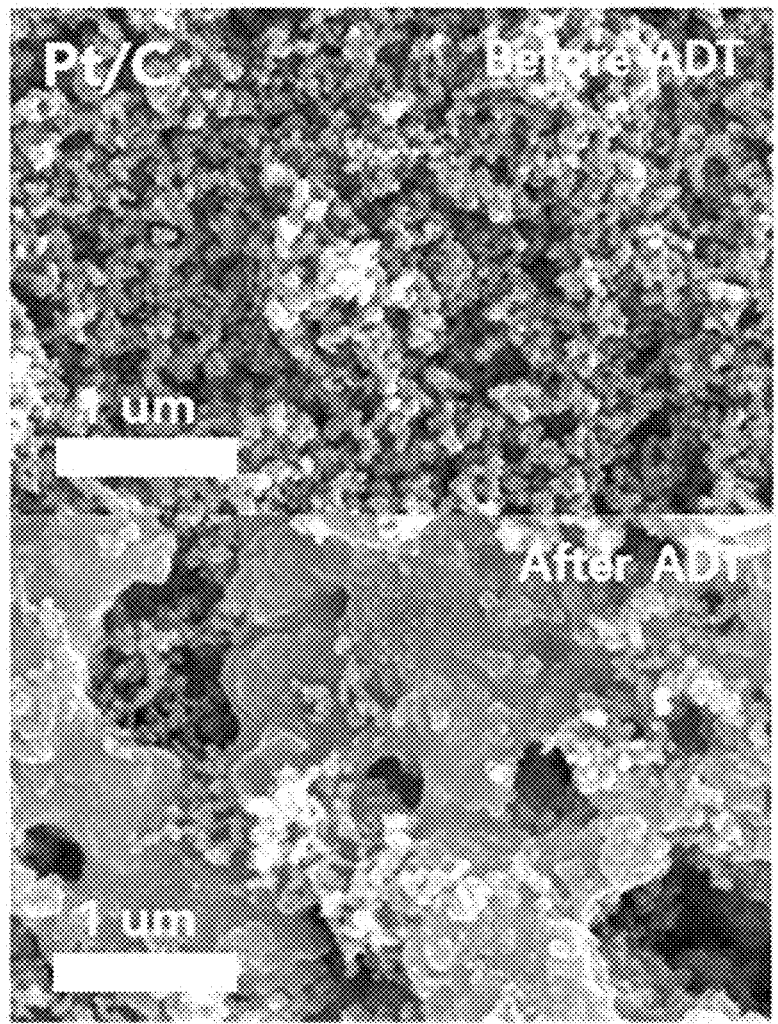

FIG. 7A shows surface FE-SEM images of the catalyst electrode fabricated in Example 2 before and after ADT and FIG. 7B shows surface FE-SEM images of the catalyst electrode fabricated in Comparative Example 1 before and after ADT.

As shown in FIG. 7A, the surface morphology of the electrode of Example 2, which was found to have the most preferred proportion of the carbon materials, after ADT was almost the same as that before ADT. In conclusion, the porous structure of the catalyst electrode of Example 2 suitable for oxygen transmission was maintained even after ADT.

In contrast, as shown in FIG. 7B, the porous structure of the catalyst electrode of Comparative Example 1 was hardly observed in the surface morphology of the catalyst electrode after ADT, unlike before ADT. This observation reveals that the porous structure of the catalyst electrode of Comparative Example 1 collapsed by oxidation of the carbon support during ADT.

As is apparent from the foregoing, the presence of the ionomer-ionomer support composite in the catalyst electrode of the present invention prevents the porous structure of the catalyst electrode from collapsing due to oxidation of the carbon support to avoid an increase in resistance to gas diffusion and can stably secure proton channels. The presence of the additional carbon materials with high conductivity is effective in preventing the electrical conductivity of the electrode from deterioration resulting from the use of the metal oxide in the ionomer-ionomer support composite and is also effective in suppressing collapse of the porous structure of the electrode to prevent an increase in resistance to gas diffusion in the electrode. Based on these effects, the fuel cell of the present invention exhibits excellent performance characteristics and prevents its performance degradation during continuous operation.

Although the present invention has been described herein with reference to the foregoing embodiments, these embodiments do not serve to limit the scope of the present invention. Those skilled in the art will appreciate that various modifications are possible, without departing from the spirit of the present invention. Accordingly, the scope of the present invention should be defined by the appended claims.

What is claimed is:

1. A catalyst electrode for a fuel cell comprising:
   a carbon support loaded with metal catalyst particles;
   an ionomer-ionomer support composite; and
   carbon materials selected from the group consisting of carbon nanotubes, carbon nanofibers, carbon nanorods, and mixtures thereof,
   wherein the ionomer-ionomer support composite comprises an ionomer support comprising a metal oxide and an ionomer covering the ionomer support,
   wherein the ionomer-ionomer support composite is present in an amount of 2.5 to 6.5% by volume based on the carbon support loaded with the metal catalyst particles.

2. The catalyst electrode according to claim 1, wherein the ionomer covering the ionomer support has a thickness of 0.5 to 10 nm.

3. The catalyst electrode according to claim 1, wherein the metal oxide has a diameter of 20 to 100 nm.

4. The catalyst electrode according to claim 1, wherein the ionomer-ionomer support composite is present in an amount of 28 to 280 parts by weight, based on 100 parts by weight of the carbon support.

5. The catalyst electrode according to claim 1, wherein the carbon materials are present in an amount of 0.1 to 5.0% by volume, based on 100% by volume of the carbon support.

6. A fuel cell comprising the catalyst electrode according to claim 1.

* * * * *